United States Patent
Tsukamoto et al.

(10) Patent No.: US 12,528,757 B2
(45) Date of Patent: Jan. 20, 2026

(54) METHOD FOR PRODUCING ADIPIC ACID

(71) Applicant: TORAY INDUSTRIES, INC., Tokyo (JP)

(72) Inventors: Daijiro Tsukamoto, Kanagawa (JP); Kenji Kawamura, Kanagawa (JP); Katsushige Yamada, Kanagawa (JP); Masato Akahira, Aichi (JP); Daisuke Yamamoto, Aichi (JP)

(73) Assignee: TORAY INDUSTRIES, INC., Tokyo (JP)

( * ) Notice: Subject to any disclaimer, the term of this patent is extended or adjusted under 35 U.S.C. 154(b) by 846 days.

(21) Appl. No.: 17/763,296

(22) PCT Filed: Sep. 24, 2020

(86) PCT No.: PCT/JP2020/035930
§ 371 (c)(1),
(2) Date: Mar. 24, 2022

(87) PCT Pub. No.: WO2021/060335
PCT Pub. Date: Apr. 1, 2021

(65) Prior Publication Data
US 2022/0356140 A1    Nov. 10, 2022

(30) Foreign Application Priority Data

Sep. 26, 2019  (JP) ................................ 2019-175467
Jan. 28, 2020  (JP) ................................ 2020-011659

(51) Int. Cl.
| | | |
|---|---|---|
| *C07C 51/09* | (2006.01) | |
| *B01J 23/44* | (2006.01) | |
| *C12P 7/44* | (2006.01) | |

(52) U.S. Cl.
CPC ............... *C07C 51/09* (2013.01); *B01J 23/44* (2013.01); *C12P 7/44* (2013.01)

(58) Field of Classification Search
CPC .................................................... C07C 51/09
See application file for complete search history.

(56) References Cited

U.S. PATENT DOCUMENTS

| | | |
|---|---|---|
| 4,939,298 A | 7/1990 | Burke |
| 5,254,255 A | 10/1993 | Kalema et al. |
| 5,487,987 A | 1/1996 | Frost et al. |
| 5,616,496 A | 4/1997 | Frost et al. |
| 5,710,325 A | 1/1998 | Bruner, Jr. et al. |
| 6,103,863 A | 8/2000 | Hayes et al. |
| 8,669,393 B2 | 3/2014 | Boussie et al. |
| 10,196,352 B2* | 2/2019 | Toray .................. B01J 23/44 |
| 2003/0045750 A1 | 3/2003 | Chou et al. |
| 2011/0003355 A1 | 1/2011 | Clark et al. |
| 2014/0322777 A1 | 10/2014 | Clark et al. |
| 2016/0347908 A1* | 12/2016 | Müller .................. C08G 69/28 |
| 2017/0320819 A1 | 11/2017 | Ito et al. |
| 2019/0112247 A1 | 4/2019 | Clark et al. |
| 2021/0002194 A1 | 1/2021 | Clark et al. |
| 2024/0140927 A1* | 5/2024 | Tsukamoto ............. C07C 51/09 |

FOREIGN PATENT DOCUMENTS

| | | | |
|---|---|---|---|
| JP | 2-212453 A | | 8/1990 |
| JP | 9-505463 A | | 6/1997 |
| JP | 2001-503425 A | | 3/2001 |
| JP | 2002-533499 A | | 10/2002 |
| JP | 2003-55303 A | | 2/2003 |
| JP | 2010-95450 A | | 4/2010 |
| JP | 2012-528885 A | | 11/2012 |
| JP | 2017-502128 A | | 1/2017 |
| JP | 2017-51117 A | | 3/2017 |
| JP | 2017051117 A | * | 3/2017 |
| WO | WO 2014/043182 A2 | | 3/2014 |
| WO | WO 2016/068108 A1 | | 5/2016 |

OTHER PUBLICATIONS

Deng et al., "Biological production of adipic acid from renewable substrates: Current and future methods", Biochemical Engineering Journal, 2016, vol. 105, p. 16-26.
International Search Report, issued in PCT/JP2020/035930, PCT/ISA/210, dated Dec. 1, 2020.
Written Opinion of the International Searching Authority, issued in PCT/JP2020/035930, PCT/ISA/237, dated Dec. 1, 2020.
Japanese Office Action for Japanese Application No. 2020-568833, dated Aug. 6, 2024, with an English translation.
Japanese Office Action for Japanese Application No. 2020-568833, dated Nov. 26, 2024, with English translation.

* cited by examiner

*Primary Examiner* — Ana Z Muresan
(74) *Attorney, Agent, or Firm* — Birch, Stewart, Kolasch & Birch, LLP

(57) ABSTRACT

The present invention relates to a method of producing adipic acid, including a step (hydrogenation step) of reacting 3-hydroxyadipic acid-3,6-lactone with hydrogen in an aqueous solvent in a presence of a hydrogenation catalyst. The hydrogenation catalyst preferably includes one kind or two or more kinds of transition metal elements selected from the group consisting of palladium, platinum, ruthenium, rhodium, rhenium, nickel, cobalt, iron, iridium, osmium, copper, and chromium.

9 Claims, No Drawings

METHOD FOR PRODUCING ADIPIC ACID

TECHNICAL FIELD

The present invention relates to a method of producing adipic acid by using a substance derivable from biomass resources as a raw material.

BACKGROUND ART

Adipic acid is a raw material of polyamide 6,6. The adipic acid can be industrially produced by nitric acid oxidation of a mixture (KA oil) of cyclohexanone and cyclohexanol, but since a large amount of dinitrogen monoxide gas having high greenhouse effect is by-produced, a method of producing adipic acid by using, as a raw material, biomass that is a renewable resource, or a substance derivable from biomass resources has been proposed. As such a method, there are a method where adipic acid is produced by fermentation using sugar or fatty acid as a raw material (Non-Patent Literature 1), a method where adipic acid is produced by chemically hydrogenating muconic acid obtained by fermentation of sugar (Patent Literature 1), a method where adipic acid is chemically synthesized via 3-oxoadipic acid and 3-hydroxyadipic acid from homocitric acid produced by fermentation of sugar (Patent Literature 2), and a method where adipic acid is chemically synthesized from sugar (Patent Literature 3).

CITATION LIST

Patent Literature

Patent Literature 1: JP-T-H9-505463 (the term "JP-T" as used herein means a published Japanese translation of a PCT patent application)
Patent Literature 2: International Publication WO2014/043182
Patent Literature 3: U.S. Pat. No. 8,669,393 specification

Non-Patent Literature

Non-Patent Literature 1: Biochemical Engineering Journal, vol. 105, pp. 16-26 (2016)

SUMMARY OF INVENTION

Technical Problem

The method of producing adipic acid by using, as a raw material, biomass that is a renewable resource, or a substance derivable from biomass resources is an environment-friendly method for solving the by-production of a dinitrogen monoxide gas, which is a problem with conventional methods, but from an industrial perspective, there are various technical problems. Specifically, the method of producing adipic acid by fermentation using sugar or fatty acid as raw materials has a problem that the yield of adipic acid is low. The method of producing adipic acid by chemically hydrogenating muconic acid obtained by fermentation of sugar has a problem that the solubility of muconic acid in a solvent is low and high-concentration reaction can hardly be launched. The method of chemically synthesizing adipic acid from homocitric acid produced by fermentation of sugar has a problem that the fermentation yield of homocitric acid is low and moreover, a multi-step chemical reaction is necessary to reach adipic acid from homocitric acid.

The method of chemically synthesizing adipic acid from sugar requires using an equivalent amount of hydrogen bromide to the sugar, but the hydrogen bromide is a toxic chemical. As such, conventional methods include industrially unfavorable factors, such as low environmental care, low yield, low solubility, multiple steps, or use of a large amount of toxic chemical, etc.

Solution to Problem

As a result of intensive studies to solve the problems above, the present inventors have found that when 3-hydroxyadipic acid-3,6-lactone which is a substance derivable from biomass resources is reacted with hydrogen in an aqueous solvent in the presence of a hydrogenation catalyst, adipic acid can be produced under industrially advantageous conditions (high yield, high-solubility raw material, single step, non-use of toxic reagent) without emitting dinitrogen monoxide. The present invention has been accomplished based on the findings.

That is, the present invention consists of the following (1) to (8).

(1) A method of producing adipic acid, including a step (hydrogenation step) of reacting 3-hydroxyadipic acid-3,6-lactone with hydrogen in an aqueous solvent in a presence of a hydrogenation catalyst.

(2) The method according to (1), in which the hydrogenation catalyst includes one kind or two or more kinds of transition metal elements selected from the group consisting of palladium, platinum, ruthenium, rhodium, rhenium, nickel, cobalt, iron, iridium, osmium, copper, and chromium.

(3) The method according to (1) or (2), in which the hydrogenation catalyst is supported on a support.

(4) The method according to (3), in which the support is a support having an acid catalytic activity.

(5) The method according to any one of (1) to (4), in which a reaction temperature in the hydrogenation step is from 100 to 350° C.

(6) The method according to any one of (1) to (5), in which the hydrogenation step is performed in an absence of ammonia.

(7) The method according to any one of (1) to (6), in which a filtrated liquid obtained after a 3-hydroxyadipic acid fermentation broth is adjusted to a pH of less than 7 by adding an acid and then passed through a nanofiltration membrane is subjected to the hydrogenation step.

(8) An aqueous adipic acid solution, having a content of n-valeric acid of from 0.01 to 20 parts by weight, relative to 100 parts by weight of adipic acid.

Advantageous Effects of Invention

According to the present invention, adipic acid can be produced under industrially advantageous conditions (high yield, high-solubility raw material, single step, non-use of toxic reagent) without emitting dinitrogen monoxide.

DESCRIPTION OF EMBODIMENTS

The present invention is described in greater details below.

3-Hydroxyadipic acid-3,6-lactone

3-Hydroxyadipic acid-3,6-lactone is an organic compound represented by the following chemical formula (1)

and can be chemically synthesized, for example, by a reaction presented in Reference Example 1 of EXAMPLES described later.

[Chem. 1]

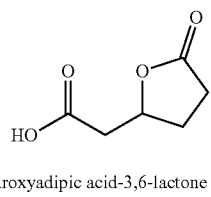

3-hydroxyadipic acid-3,6-lactone

In addition, 3-hydroxyadipic acid-3,6-lactone can also use, as a starting material, 3-oxoadipic acid derivable from biomass resources. In this case, for example, as illustrated in the following scheme 1,3-hydroxyadipic acid-3,6-lactone can be synthesized by hydrogenation and condensation of 3-oxoadipic acid.

[Chem. 2]

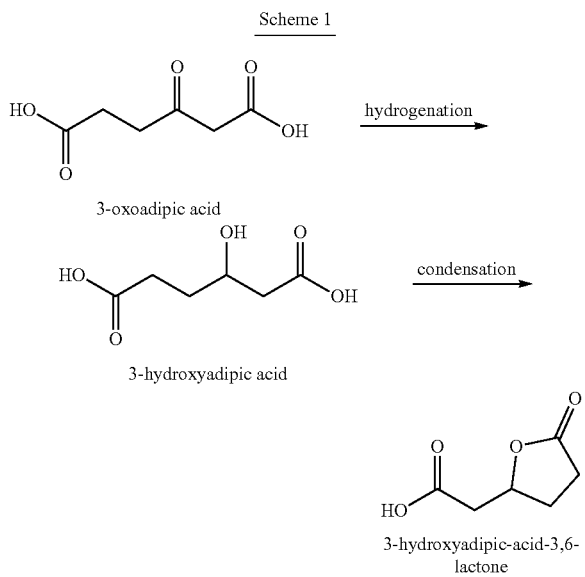

The 3-oxoadipic acid is a compound biosynthesized in the metabolic process of an aromatic compound such as protocatechuic acid or catechol, etc. As the method for producing 3-oxoadipic acid by utilizing the route above, for example, JP-A-2012-59 discloses a method where 3-oxoadipic acid is produced by fermentation from protocatechuic acid by using recombinant *Pseudomonas putida*. Note that here the protocatechuic acid and catechol are a biomass-derived substance which can be produced by microbial fermentation using sugar as a carbon source. For example, specification of U.S. Pat. No. 5,272,073 discloses a method of producing protocatechuic acid and catechol by fermentation using glucose as a carbon source. Accordingly, 3-hydroxyadipic acid-3,6-lactone can be said to be a substance derivable from biomass resources.

The 3-hydroxyadipic acid-3,6-lactone may be a carboxylic acid, a carboxylate, or a carboxylic acid ester, and even a mixture thereof can also be used as a starting material of the present invention. In the present description, these are collectively referred to as "3-hydroxyadipic acid-3,6-lactone".

The carboxylate of 3-hydroxyadipic acid-3,6-lactone includes, for example, 3-hydroxyadipic acid-3,6-lactone ammonium salt, 3-hydroxyadipic acid-3,6-lactone lithium salt, 3-hydroxyadipic acid-3,6-lactone sodium salt, 3-hydroxyadipic acid-3,6-lactone potassium salt, etc.

The carboxylic acid ester of 3-hydroxyadipic acid-3,6-lactone includes, for example, 3-hydroxyadipic acid-3,6-lactone methyl ester, 3-hydroxyadipic acid-3,6-lactone ethyl ester, 3-hydroxyadipic acid-3,6-lactone propyl ester, 3-hydroxyadipic acid-3,6-lactone isopropyl ester, 3-hydroxyadipic acid-3,6-lactone butyl ester, 3-hydroxyadipic acid-3,6-lactone isobutyl ester, etc.

[Aqueous Solvent]

In the present invention, adipic acid is produced from 3-hydroxyadipic acid-3,6-lactone in an aqueous solvent. The aqueous solvent as used in the present invention means water or a mixed solvent based on water and mixed with a water-miscible organic solvent. The phrase "based on water" means that the percentage of water in the mixed solvent is more than 50 vol %, preferably 70 vol % or more, more preferably 90 vol % or more.

Examples of the water-miscible organic solvent that can be used in the present invention include methanol, ethanol, n-propanol, isopropanol, n-butanol, isobutanol, tert-butanol, 1,2-dimethoxyethane, diglyme, tetrahydrofuran, dioxane, γ-butyrolactone, N-methylpyrrolidone, dimethylsulfoxide, dimethylformamide, dimethylacetamide, acetone, etc.

The pH of the aqueous solvent is not particularly limited but in consideration of suppression of catalyst deterioration, suppression of by-product generation, corrosiveness to reaction device, etc., the aqueous solvent is preferably at a pH of 2 to 13, more preferably at a pH of 3 to 11, still more preferably at a pH of 4 to 10.

[Hydrogenation Catalyst]

In the present invention, a hydrogenation catalyst is used for producing adipic acid from 3-hydroxyadipic acid-3,6-lactone.

The hydrogenation catalyst means a metal and/or metal complex having hydrogenation capability. The phrase "having hydrogenation capability" as used herein means to have a capability of adding, in the presence of hydrogen, a hydrogen atom to an unsaturated bond such as carbon-carbon double bond (C=C), carbon-carbon triple bond (C≡C), carbon-oxygen double bond (C=O), carbon-nitrogen double bond (C=N) or carbon-nitrogen triple bond (C≡N), etc.

The hydrogenation catalyst preferably contains a transition metal element, specifically, preferably contains one member or two or more members selected from the group consisting of palladium, platinum, ruthenium, rhodium, rhenium, nickel, cobalt, iron, iridium, osmium, copper and chromium, more preferably contains one member or two or more members selected from the group consisting of palladium, platinum, nickel, cobalt, iron, copper and chromium.

The existing state of the hydrogenation catalyst is not particularly limited but may be any of a cluster state, a nanoparticle state, a microparticle state, a bulk state, a state of being dispersed in a solution like colloid, and a state of being uniformly dissolved in a solvent.

From the standpoint that the amount of metal used can be saved, the active surface of catalyst increases, etc., the hydrogenation catalyst is preferably used by supporting it on a support. The supported amount is usually, in terms of element, from 0.1 to 20 wt % relative to the support.

The hydrogenation catalyst can be supported on a support by a known method such as impregnation method, deposition-precipitation method or gas-phase supporting method, etc.

The support for the hydrogenation catalyst includes carbon, polymer, metal oxide, metal sulfide, zeolite, clay, heteropolyacid, solid phosphoric acid, and hydroxyapatite, etc., but for the reason that the selectivity for adipic acid is more enhanced, a support having acid catalytic activity is preferred.

The polymer having acid catalytic activity includes an acidic ion-exchange resin. Specifically, a styrene-based sulfonic acid-type ion-exchange resin or a phenol-based sulfonic acid-type ion-exchange resin can be used. Examples thereof include "DIAION" produced by Mitsubishi Chemical Corporation, "Lewatit" produced by Lanxess AG, "Amberlite" and "Amberlyst" produced by Rohm and Haas Co., and "DOWEX" produced by Dow Chemical Co., etc.

Examples of the metal oxide having acid catalytic activity include oxides containing one kind or two or more kinds of metal elements selected from the group consisting of Sc, Y, Ce, Ti, Zr, V, Nb, Ta, Cr, Mo, W, Mn, Fe, Zn, Cd, Al, Ga, In, Si, Ge, Sn, and Pb. More specifically, scandium oxide ($Sc_2O_3$), cerium oxide ($CeO_2$), anatase-type titanium oxide ($A-TiO_2$), rutile-type titanium oxide ($R-TiO_2$), zirconium oxide ($ZrO_2$), vanadium oxide ($V_2O_5$), niobium oxide ($Nb_2O_5$), tantalum oxide ($Ta_2O_5$), chromium oxide ($Cr_2O_3$), molybdenum oxide ($MoO_3$), tungsten oxide ($WO_3$), manganese oxide ($MnO_2$), iron oxide ($Fe_2O_3$, $Fe_3O_4$), zinc oxide (ZnO), aluminum oxide ($Al_2O_3$), gallium oxide ($Ga_2O_3$), indium oxide ($In_2O_3$), silicon dioxide ($SiO_2$), germanium oxide ($GeO_2$), tin oxide ($SnO_2$), lead oxide (PbO), and silica-alumina ($SiO_2$—$Al_2O_3$), etc. may be exemplified.

As the zeolite having acid catalytic activity, zeolites assigned structure codes consisting of three alphabetical letters in the database of International Zeolite Association can be used. Specifically, examples thereof include zeolites assigned structure codes such as LTA, FER, MWW, MFI, MOR, LTL, FAU, BEA, CHA, and CON, etc.

Examples of the clay having acid catalytic activity include kaolin, montmorillonite, bentonite, saponite, and acid clay, etc.

[Hydrogenation Step]

In the hydrogenation step of 3-hydroxyadipic acid-3,6-lactone, hydrogen may be added en bloc or sequentially to the reactor. The partial pressure of hydrogen is not particularly limited, but if the partial pressure is too low, the reaction time is prolonged, whereas if it is too high, this is disadvantageous in view of equipment safety. Therefore, at the start of the reaction, the partial pressure is, at normal temperature, preferably 0.1 MPa or more and 10 MPa or less (gauge pressure), more preferably 0.5 MPa or more and 3 MPa or less (gauge pressure).

As for the reaction form, the reaction can be conducted in a form using any reactor of a batch tank-type reactor, a semi-batch tank-type reactor, a continuous tank-type reactor or a continuous tubular reactor. In the case of performing the reaction by using a solid catalyst in which a metal/metal complex having hydrogenation capability is supported, the reaction can be conducted in any system of a suspended bed system, a fixed bed system, a moving bed system, or a fluidized bed system.

A too low reaction temperature and a too high reaction temperature are not preferred, because in the former case, the reaction speed slows down and in the latter case, the energy consumption increases. From these standpoints, the reaction temperature is preferably from 100 to 350° C., more preferably from 120 to 300° C., still more preferably from 130 to 280° C., yet still more preferably from 140 to 250° C., even yet still more preferably from 150 to 230° C., still more preferably from 160 to 220° C.

As for the atmosphere in the reactor, an inert gas such as nitrogen, helium or argon may coexist as well as hydrogen, however, this leads to deterioration of the hydrogenation catalyst and generation of a detonating gas. Therefore, the oxygen concentration is preferably 5 vol % or less. Also, in view of stability of 3-hydroxyadipic acid-3,6-lactone and adipic acid, the amount of ammonia relative to the 3-hydroxyadipic acid-3,6-lactone raw material is preferably 5 wt % or less, more preferably 3 wt % or less, still more preferably 0 wt % (i.e., a reaction in the absence of ammonia).

The charged amount of 3-hydroxyadipic acid-3,6-lactone relative to the aqueous solvent is not particularly limited, but if the charged amount is small, this is industrially disadvantageous. From such a viewpoint, the charged amount of 3-hydroxyadipic acid-3,6-lactone relative to the aqueous solvent is preferably 0.1 parts by weight or more, more preferably 0.2 parts by weight or more, still more preferably 1.0 parts by weight or more.

[Recovery of Adipic Acid]

Through a normal separation and purification operation such as filtration, distillation, extraction or crystallization, etc., adipic acid can be recovered from an aqueous adipic acid (carboxylic acid, carboxylate, carboxylic acid ester) solution produced by subjecting 3-hydroxyadipic acid-3,6-lactone to a hydrogenation step in an aqueous solvent.

[Adipic Acid]

In the present invention, in the case where a mixed solvent of water and a water-miscible organic solvent, except for water and primary alcohol as well as water and secondary alcohol, is used as the solvent, a carboxylic acid as adipic acid is produced when a carboxylic acid of 3-hydroxyadipic acid-3,6-lactone is used as the raw material, a carboxylate as adipic acid is produced when a carboxylate of 3-hydroxyadipic acid-3,6-lactone is used as the raw material, and a mixture of adipic acid and adipic acid monoester is produced when a 3-hydroxyadipic acid-3,6-lactone ester is used as the raw material. In the present invention, when the water-miscible organic solvent mixed with water is a primary alcohol or secondary alcohol such as methanol, ethanol, n-propanol or isopropanol, etc., a mixture of adipic acid, adipic acid monoester and adipic acid diester is obtained after the reaction due to esterification of the raw material and the produced adipic acid with such an alcohol. In the present description, a carboxylic acid, carboxylate and carboxylic acid ester of adipic acid and a mixture thereof are collectively referred to as "adipic acid".

[Various Derivatizations]

The adipic acid obtained in the present invention can be converted to an adipic acid diester by subjecting the adipic acid further to an esterification reaction. The method for esterification is not particularly limited but includes, for example, an esterification reaction using an acid catalyst and an alcohol solvent. The acid catalyst used here is not particularly limited but includes a mineral acid such as sulfuric acid and hydrochloric acid, and a solid acid such as silica and strongly acidic resin. Other methods for esterification include dehydration condensation of an alcohol with a carboxylic acid using a condensing agent, dehydration condensation of an alcohol with a carboxylic acid using a Lewis acid catalyst such as boron trifluoride-methanol complex, a production method under base conditions using a metal alkoxide, and a method using an alkylating reagent such as diazomethane or alkyl halide, etc.

Also, adiponitrile can be produced by a known method (for example, JP-B-S61-24555) from adipic acid obtained in the present invention. When the obtained adiponitrile is hydrogenated by a known method (for example, JP-T-2000-508305), hexamethylenediamine can be produced. Furthermore, polyamide 6,6 can be produced from adipic acid obtained in the present invention and hexamethylenediamine obtained from the adipic acid, by performing polymerization by a known method (see, for example, Osamu Fukumoto ed., "Polyamide Resin Handbook", Nikkan Kogyo Shimbun. Ltd. (January, 1998)).

[Production of Adipic Acid from 3-Hydroxyadipic Acid Fermentation Broth]

As described above, the present invention is characterized by producing adipic acid from 3-hydroxyadipic acid-3,6-lactone contained in an aqueous solvent, i.e., a 3-hydroxyadipic acid-3,6-lactone-containing aqueous solution. The 3-hydroxyadipic acid-3,6-lactone-containing aqueous solution may also be prepared from a 3-hydroxyadipic acid fermentation broth. Specifically, a filtrated liquid obtained after an acid is added to a 3-hydroxyadipic acid fermentation broth so as to adjust the pH to a pH of less than 7 which is acidic condition, and the resulting fermentation broth is passed through a nanofiltration membrane, may be subjected to the hydrogenation step.

3-Hydroxyadipic acid is a dicarboxylic acid having a carbon number of 6 and having a hydroxyl group (—OH) at the β-position.

The 3-hydroxyadipic acid fermentation broth encompasses not only a culture broth resulting from production of 3-hydroxyadipic acid by the action of microorganisms in a liquid culture medium containing fermentation raw materials such as carbon source, nitrogen source, inorganic salts, amino acid, and vitamin, etc., but also a 3-hydroxyadipic acid fermentation broth resulting from addition of chemically or biologically synthesized 3-hydroxyadipic acid to a culture broth produced by culturing microorganisms in a liquid culture medium containing fermentation raw materials. The 3-hydroxyadipic acid fermentation broth can be prepared, for example, by the method disclosed in International Publication WO2017/209102.

Addition of an acid to a 3-hydroxyadipic acid fermentation broth so as to adjust the pH to a pH of less than 7, i.e., acidic conditions, facilitates passing of 3-hydroxyadipic acid through a nanofiltration membrane. Furthermore, when an acid is added to a 3-hydroxyadipic acid fermentation broth, 3-hydroxyadipic acid-3,6-lactone is produced from 3-hydroxyadipic acid in the aqueous solution. A lower pH of the aqueous solution is preferable, because production of 3-hydroxyadipic acid-3,6-lactone tends to be promoted, but it is necessary to consider corrosion of an apparatus, which is associated with low pH conditions. Considering these factors, the aqueous solution is preferably at a pH of 4.5 or less, more preferably at a pH of 1.5 or more and 4.5 or less, still more preferably at a pH of 2.0 or more and 4.0 or less.

The acid used for adjusting the pH of the 3-hydroxyadipic acid fermentation broth is not particularly limited as long as a pH of less than 7, i.e., acidic conditions, can be established. A mineral acid such as sulfuric acid, hydrochloric acid, nitric acid, phosphoric acid and boric acid, or an organic acid such as formic acid, acetic acid and propionic acid, can be favorably used.

The filtration of the 3-hydroxyadipic acid fermentation broth through a nanofiltration membrane may be performed under pressure. The filtration pressure is not particularly limited, but a pressure in the range of 0.1 MPa or more and 8 MPa or less is preferably used, because if the filtration pressure is less than 0.1 MPa, the membrane permeation rate decreases and if it is more than 8 MPa, this affects damage of the membrane. A filtration pressure of 0.5 MPa or more and 7 MPa or less is more preferred, because the membrane permeation flux is high and in turn, permeation of 3-hydroxyadipic acid can be efficiently conducted.

In the present invention, with respect to the filtration of the 3-hydroxyadipic acid fermentation broth through a nanofiltration membrane, the recovery rate of 3-hydroxyadipic acid or 3-hydroxyadipic acid-3,6-lactone can be enhanced by returning the non-permeated liquid again to raw water and repeatedly performing the filtration.

Microbial cell bodies, proteins and solids generated due to denaturation of proteins are preferably removed from the 3-hydroxyadipic acid fermentation broth in a step before passing the 3-hydroxyadipic acid fermentation broth through a nanofiltration membrane.

The method for removing microbial cell bodies is not particularly limited, but the removal can be performed by a normal operation such as microfiltration membrane (MF membrane) separation or centrifugal separation, etc.

The method for removing proteins or solids generated due to denaturation of proteins is not particularly limited, but the removal can be performed, for example, by a normal operation such as ultrafiltration (UF membrane) separation, etc.

The order of removing microbial cell bodies and proteins is not particularly limited, but it is preferable to first remove microbial cell bodies having a large size, because clogging of an ultrafiltration membrane can be prevented at the time of removing proteins.

As for the material of the nanofiltration membrane used in the present invention, a polymeric material such as cellulose acetate-based polymer, polyamide, polyester, polyimide or vinyl polymer may be used. The membrane is not limited to a membrane composed of one kind of a material among those materials and may be a membrane containing a plurality of membrane materials. Also, the membrane structure may be either an asymmetric membrane having a dense layer on at least one surface of the membrane and having micropores with a pore size gradually increasing toward the inside or another surface of the membrane from the dense layer, or a composite membrane having, on the dense layer of the asymmetric membrane, a very thin functional layer formed of other materials. As the composite membrane, for example, a composite membrane described in JP-A-S62-201606, in which a nanofiltration membrane composed of a polyamide functional layer is formed on a support membrane using polysulfone as a membrane material, may be used.

In the present invention, among these, a composite membrane using polyamide for a functional layer, which has all of high pressure resistance, high water permeability and high solute removal performance and exhibits an excellent potential, is preferred. Furthermore, in order to enable maintaining durability against operation pressure, high water permeability and rejection performance, a membrane having a structure in which polyamide is used for a functional layer and the functional layer is held by a support made of a porous membrane or a nonwoven fabric, is preferred. In the nanofiltration membrane using polyamide for a functional layer, the preferable carboxylic acid component that is a monomer constituting the polyamide includes, for example, an aromatic carboxylic acid such as trimesic acid, benzophenone tetracarboxylic acid, trimellitic acid, pyromellitic acid, isophthalic acid, terephthalic acid, naphthalenedicarboxylic acid, diphenylcarboxylic acid and pyridine carboxylic acid. In consideration of solubility for a membrane-forming solvent, trimesic acid, isophthalic acid, terephthalic acid, or a mixture thereof is more preferred.

The preferable amine component that is a monomer constituting the polyamide includes a primary diamine having an aromatic ring, such as m-phenylenediamine, p-phenylenediamine, benzidine, methylenebisdianiline, 4,4'-diaminobiphenyl ether, dianisidine, 3,3',4-triaminodiphenyl ether, 3,3',4,4'-tetraminobiphenyl ether, 3,3'-dioxybenzidine, 1,8-naphthalenediamine, m(p)-monomethylphenylenediamine, 3,3'-monomethylamino-4,4'-diaminobiphenyl ether, 4,N,N'-(4-aminobenzoyl)-p(m)-phenylenediamine-2,2'-bis(4-aminophenylbenzimidazole), 2,2'-bis(4-aminophenylbenzoxazole) and 2,2'-bis(4-aminophenylbenzothiazole), and a secondary diamine such as piperazine, piperidine and derivatives thereof. Among others, a nanofiltration membrane using, for the functional layer, a crosslinked polyamide containing piperazine or piperidine as a monomer has heat resistance and chemical resistance, in addition to pressure resistance and durability, and therefore, is preferably used. A nanofiltration membrane containing, as a main component, the crosslinked piperazine polyamide or crosslinked piperidine polyamide is more preferred. The nanofiltration membrane using the polyamide containing piperazine polyamide for the functional layer includes, for example, those described in JP-A-S62-201606, and specific examples thereof include crosslinked piperazine polyamide-based semipermeable membranes UTC-60 and UTC-63 manufactured by Toray Industries, Inc.

As the spiral-wound nanofiltration membrane element used in the present invention, for example, nanofilter modules SU-210, SU-220, SU-600, and SU-610 manufactured by Toray Industries. Inc. using crosslinked piperazine polyamide for the functional layer and including UTC-60 or UTC-63 manufactured by the same company can also be used. Other examples include NF-45, NF-90, NF-200 and NF-400, which are nanofiltration membranes manufactured by Filmtec Corporation using a crosslinked piperazine polyamide for the functional layer; NF99, NF97 and NF99HF, which are nanofiltration membranes manufactured by Alfa-Laval using polyamide for the functional layer; and GEsepa which is a cellulose acetate-based nanofiltration membrane manufactured by GE Osmonics.

When a filtrated liquid of the 3-hydroxyadipic acid fermentation broth through a nanofiltration membrane is passed through a reverse osmosis membrane (RO membrane), 3-hydroxyadipic acid or 3-hydroxyadipic acid-3,6-lactone can be concentrated on the non-permeation side, and the concentrated liquid obtained may be subjected to the hydrogenation step.

As the membrane material of the reverse osmosis membrane used in the present invention, a commonly commercially available polymeric material such as cellulose acetate-based polymer, polyamide, polyester, polyimide or vinyl polymer may be used. The membrane is not limited to a membrane composed of one kind of a material among those materials and may be a membrane containing a plurality of membrane materials. As for the shape of the membrane, a membrane having an appropriate shape such as flat membrane type, spiral type and hollow fiber type can be used.

Specific examples of the reverse osmosis membrane used in the present invention include polyamide-based reverse osmosis membranes (UTC) SU-710, SU-720, SU-720F, SU-710L, SU-720L, SU-720LF, SU-720R, SU-710P, SU-720P. SU-810, SU-820, SU-820L, and SU-820FA manufactured by Toray Industries. Inc., cellulose acetate-based reverse osmosis membranes SC-L100R, SC-L200R, SC-1100, SC-1200, SC-2100, SC-2200, SC-3100, SC-3200, SC-8100, and SC-8200 manufactured by the same company; NTR-759HR, NTR-729HF, NTR-70SWC, ES10-D, ES20-D, ES20-U, ES15-D, ES15-U, and LF10-D manufactured by Nitto Denko Corporation; RO98pHt, RO99, HR98PP, and CE4040C-30D manufactured by Alfa-Laval, GE Sepa manufactured by GE; and BW30-4040, TW30-4040, XLE-4040, LP-4040, LE-4040, SW30-4040, and SW30HRLE-4040 manufactured by Filmtec.

The filtration with a reverse osmosis membrane is performed under pressure, and the filtration pressure is preferably 1 MPa or more and 8 MPa or less, because if the filtration pressure is less than 1 MPa, the membrane permeation rate decreases and if it is more than 8 MPa, this affects damage of the membrane. The filtration pressure is more preferably 1 MPa or more and 7 MPa or less, still more preferably 2 MPa or more and 6 MPa or less.

[Aqueous Adipic Acid Solution]

In the present invention, the raw material 3-hydroxyadipic acid-3,6-lactone is converted to adipic acid in an aqueous solvent and therefore, after the reaction, an aqueous solvent containing adipic acid is obtained. In the present invention, an aqueous adipic acid solution indicates this adipic acid-containing aqueous solvent obtained after the reaction.

In the case of converting 3-hydroxyadipic acid-3,6-lactone to adipic acid, n-valeric aid (IUPAC name: n-pentanoic acid) is produced as a by-product and therefore, an aqueous adipic acid solution containing a very small amount of n-valeric acid is obtained. The n-valeric acid contained in the aqueous adipic acid solution exists in the form of a carboxylic acid, a carboxylate, a carboxylic acid ester, or a mixture thereof and in the present description, these forms are collectively referred as "n-valeric acid".

The content of n-valeric acid relative to 100 parts by weight of adipic acid in the aqueous adipic acid solution is appropriately from 0.01 to 20 parts by weight, preferably from 0.02 to 18 parts by weight, more preferably from 0.05 to 16 parts by weight. If the content of n-valeric acid relative to 100 parts by weight of adipic acid in the aqueous adipic acid solution exceeds 20 parts by weight, use as a polyamide raw material is sometimes inappropriate. On the other hand, if an aqueous adipic acid solution having a n-valeric acid content of less than 0.01 parts by weight is prepared from an aqueous adipic acid solution in which the content of n-valeric acid relative to 100 parts by weight of adipic acid is from 0.01 to 20 parts by weight, an excessive load is imposed on purification, nevertheless, a particular advantage as a polyamide raw material may not be obtained compared to before the purification.

EXAMPLES

The present invention is described in greater detail below by referring to Examples, but the present invention is not limited to these Examples. The reaction results in Examples and Comparative Examples are defined by the following formulae.

Raw material conversion(mol %)=reacted raw material(mol)/fed raw material(mol)×100

Adipic acid selectivity(mol %)=adipic acid production amount (mol)/reacted raw material (mol)×100

Each of a reaction solution and an aqueous solution of a reaction solution concentrate was analyzed by gas chromatography (GC) and high-performance liquid chromatography (HPLC). The product was quantitated with an absolute calibration curve prepared using an authentic sample. The analysis conditions of GC and HPLC are shown below.

[GC Analysis Conditions]
GC device: "GC2010 plus" (manufactured by Shimadzu Corporation)
Column: "InertCap for amines", length of 30 m, inner diameter of 0.32 mm (manufactured by GL Sciences Inc.)
Carrier gas: helium, constant linear velocity (40.0 cm/sec)
Vaporizing chamber temperature: 250° C.
Detector temperature: 250° C.
Column oven temperature: 100° C.→(10° C./min)→230° C., 10 minutes (23 minutes in total)
Detector: FID

[HPLC Analysis Conditions 1]
HPLC device: "Prominence" (manufactured by Shimadzu Corporation)
Column: "Synergi hydro-RP" (manufactured by Phenomenex Inc.), length: 250 mm, inner diameter: 4.60 mm, particle diameter: 4 μm
Mobile phase: aqueous 0.1 wt % phosphoric acid solution/acetonitrile=95/5 (volume ratio)
Flow velocity: 1.0 mL/min
Detector: UV (210 nm)
Column temperature: 40° C.
Analysis time: 23 minutes The pH of various aqueous solutions was analyzed by the following method.

[pH Analysis Method]
Horiba pH Meter F-52 (manufactured by Horiba Ltd.) was used. The pH calibration was performed using a standard pH 4.01 solution (produced by FUJIFILM Wako Pure Chemical Corporation), a standard pH 6.86 solution (produced by FUJIFILM Wako Pure Chemical Corporation), and a standard pH 9.18 solution (produced by FUJIFILM Wako Pure Chemical Corporation).

(Reference Example 1) Preparation of 3-hydroxyadipic acid-3,6-lactone

3-Hydroxyadipic acid-3,6-lactone used in the present invention was prepared by chemical synthesis. First, 1.5 L of super dehydrated tetrahydrofuran (produced by FUJIFILM Wako Pure Chemical Corporation) was added to 13.2 g (0.1 mol) of succinic acid monomethyl ester (produced by FUJIFILM Wako Pure Chemical Corporation), and 16.2 g (0.1 mol) of carbonyldiimidazole (produced by FUJIFILM Wako Pure Chemical Corporation) was added thereto with stirring, followed by stirring at room temperature for 1 hour under nitrogen atmosphere. To the obtained suspension, 15.6 g (0.1 mol) of malonic acid monomethyl ester potassium salt and 9.5 g (0.1 mol) of magnesium chloride were added, and the resulting mixture was stirred at room temperature for 1 hour under nitrogen atmosphere and then stirred at 40° C. for 12 hours. After the completion of reaction, 0.05 L of 1 mol/L hydrochloric acid was added, and the resulting mixture was subjected to extraction with ethyl acetate and then to separation purification by silica gel column chromatography (hexane:ethyl acetate=1:5) to obtain 13.1 g of pure 3-oxo-hexanedicarboxylic acid dimethyl ester.

0.1 L of methanol (produced by Kokusan Chemical Co., Ltd.) was added to 10 g (0.05 mol) of the obtained 3-oxo-hexanedicarboxylic acid dimethyl ester, and 0.02 L of an aqueous 5 mol/L sodium hydroxide solution was added thereto with stirring, followed by stirring at room temperature for 2 hours. After the completion of reaction, the pH was adjusted to 1 with 5 mol/L hydrochloric acid and subsequently, 2.0 g (0.05 mol) of sodium borohydride (produced by FUJIFILM Wako Pure Chemical Corporation) was added thereto, followed by stirring at room temperature for 2 hours. After the resulting reaction solution was concentrated using a rotary evaporator, 0.1 L of ultrapure water was added, and 0.01 L of 1 mol/L sulfuric acid was added thereto with stirring, followed by stirring at 100° C. for 2 hours. After the completion of reaction, the reaction solution was concentrated using a rotary evaporator and then subjected to separation purification by silica gel column chromatography (chloroform:methanol=10:1) to obtain 5.8 g of pure 3-hydroxyadipic acid-3,6-lactone (carboxylic acid) (in light yellow syrup form). The NMR spectrum of the obtained 3-hydroxyadipic acid-3,6-lactone is as follows.

$^1$H-NMR (400 MHz, D$_2$O): δ 2.03 (m, 1H), δ 2.04-2.90 (m, 5H), δ 5.00 (m, 1H)

(Example 1) Production of Adipic Acid

To a stainless steel autoclave (manufactured by Taiatsu Techno Corporation) having an internal capacity of 0.1 L, 0.144 g of 3-hydroxyadipic acid-3,6-lactone (carboxylic acid), 50 mL of water, and 0.025 g of Palladium, 5% on gamma alumina powder, reduced (5% Pd/Al$_2$O$_3$, produced by Alfa Aesar) as a catalyst were added. The interior of the autoclave was purged with nitrogen, and hydrogen gas was then added so as to adjust the hydrogen partial pressure inside the autoclave to become 0.9 MPa. Thereafter, the temperature inside the autoclave was raised to 200° C. The gauge pressure at 200° C. was 1.5 MPa. The autoclave was held at 200° C. for 3 hours and then allowed to cool to room temperature and after returning the pressure to normal pressure by releasing the gas in the autoclave, the reaction solution was recovered. The catalyst was removed by filtration, and part of the filtrated liquid was sampled. Also, the filtrated liquid was concentrated using a rotary evaporator (manufactured by Tokyo Rikakikai Co., Ltd.) to obtain a concentrate, and the sampled filtrated liquid and a 1 g/L aqueous solution of the concentrate were analyzed by GC and HPLC (HPLC Analysis Conditions 1). The results are shown in Table 1. Adipic acid was produced at a high raw material conversion and a high adipic acid selectivity.

(Example 2) Production of Adipic Acid

The reaction was performed in the same manner as in Example 1 except that 2.5 g of 3-hydroxyadipic acid-3,6-lactone (carboxylic acid) was used for the raw material. The results are shown in Table 1. Even when the raw material concentration was increased, the raw material conversion and the adipic acid selectivity were remarkably high.

(Comparative Example 1) Production of Adipic Acid

The reaction was performed in the same manner as in Example 1 except that dioxane was used as the solvent in place of water. The results are shown in Table 1. The raw material conversion remained at 67.4%.

(Comparative Example 2) Production of Adipic Acid

The reaction was performed in the same manner as in Example 1 except that tert-butanol was used as the solvent in place of water. The results are shown in Table 1. The raw material conversion was as significantly low as 38.9%, and the adipic acid selectivity remained at 87.0% as well.

TABLE 1

| | Solvent | Catalyst | Reaction Temperature (°C.) | Raw Material Conversion (mol %) | Adipic Acid Selectivity (mol %) |
|---|---|---|---|---|---|
| Example 1 | water | 5% Pd/γ-$Al_2O_3$ | 200 | 100 | 100 |
| Example 2 | water | 5% Pd/γ-$Al_2O_3$ | 200 | 87.8 | 97.7 |
| Comparative Example 1 | dioxane | 5% Pd/γ-$Al_2O_3$ | 200 | 67.4 | 99.9 |
| Comparative Example 2 | tert-butanol | 5% Pd/γ-$Al_2O_3$ | 200 | 38.9 | 87.0 |

(Reference Example 2) Preparation of 3-hydroxyadipic acid

3-Hydroxyadipic acid used in the present invention was prepared by chemical synthesis. First, 1.5 L of super dehydrated tetrahydrofuran (produced by FUJIFILM Wako Pure Chemical Corporation) was added to 13.2 g (0.1 mol) of succinic acid monomethyl ester (produced by FUJIFILM Wako Pure Chemical Corporation), and 16.2 g (0.1 mol) of carbonyldiimidazole (produced by FUJIFILM Wako Pure Chemical Corporation) was added thereto with stirring, followed by stirring at room temperature for 1 hour under nitrogen atmosphere. To the obtained suspension, 15.6 g (0.1 mol) of malonic acid monomethyl ester potassium salt and 9.5 g (0.1 mol) of magnesium chloride were added, and the resulting mixture was stirred at room temperature for 1 hour under nitrogen atmosphere and then stirred at 40° C. for 12 hours. After the completion of reaction, 0.05 L of 1 mol/L hydrochloric acid was added, and the resulting mixture was subjected to extraction with ethyl acetate and then to separation purification by silica gel column chromatography (hexane:ethyl acetate=1:5) to obtain 13.1 g of pure 3-oxo-hexanedicarboxylic acid dimethyl ester.

0.1 L of methanol (produced by Kokusan Chemical Co., Ltd.) was added to 10 g (0.05 mol) of the obtained 3-oxo-hexanedicarboxylic acid dimethyl ester, and 0.02 L of an aqueous 5 mol/L sodium hydroxide solution was added thereto with stirring, followed by stirring at room temperature for 2 hours. After the completion of reaction, the pH was adjusted to 1 with 5 mol/L hydrochloric acid and subsequently, 2.0 g (0.05 mol) of sodium borohydride (produced by Wako Pure Chemical Corporation) was added thereto, followed by stirring at room temperature for 2 hours. After the completion of reaction, the resulting reaction solution was concentrated using a rotary evaporator and then recrystallized with water to obtain 7.2 g of pure 3-hydroxyadipic acid. The NMR spectrum of the obtained 3-hydroxyadipic acid is as follows.

$^1$H-NMR (400 MHz, $CD_3OD$): δ 1.70 (m, 1H), δ 1.83 (m, 1H), δ 2.42 (m, 4H), δ 4.01 (m, 1H)

(Reference Example 3) Preparation of 3-hydroxyadipic Acid Fermentation Broth

4 L of a 3-hydroxyadipic acid fermentation broth was prepared by adding 3-hydroxyadipic acid prepared in Reference Example 2 to a culture broth prepared according to the method using *Serratia grimesii* (NBRC13537)/pBBR1MCS-2:CgpcaF strain described in Example 14 of International Publication WO2017/209102. The supernatant was analyzed by HPLC. The 3-hydroxyadipic acid concentration was 14 g/L, and 3-hydroxyadipic acid-3,6-lactone was not detected. pH: 6.8.

(Example 3) Production of Adipic Acid

4 L of the 3-hydroxyadipic acid fermentation broth prepared in Reference Example 3 was passed through a microfiltration membrane (a porous membrane having a pore size of 0.01 μm or more and less than 1 μm; manufactured by Toray Industries, Inc.). Thereafter, the pH was adjusted to 4.0 by the addition of concentrated sulfuric acid (produced by Sigma-Aldrich), followed by stirring for 12 hours, and the resulting aqueous solution was passed through an ultrafiltration membrane (molecular weight cut off: 10,000; manufactured by Toray Industries, Inc.) (3-hydroxyadipic acid-3,6-lactone concentration: 0.6 g/L). 3 L of the thus-obtained aqueous solution was passed through a nanofiltration membrane under the following nanofiltration membrane treatment conditions to obtain a filtrated liquid (3-hydroxyadipic acid-3,6-lactone concentration: 0.5 g/L).
[Nanofiltration Membrane Treatment Conditions]
  Separation membrane: UTC-63 (manufactured by Toray Industries, Inc.)
  Membrane separation unit: "SEPA" (registered trademark) CF-11 (manufactured by GE W & PT)
  Operation temperature: 25° C.
  Filtration pressure: 0.5 MPa
To a stainless steel autoclave (manufactured by Taiatsu Techno Corporation) having an internal capacity of 0.1 L, 30 mL of the filtrated liquid above (3-hydroxyadipic acid-3,6-lactone concentration: 0.5 g/L) and 0.025 g of Palladium, 5% on gamma alumina powder, reduced (5% Pd/$Al_2O_3$, produced by Alfa Aesar) as a catalyst were added. The interior of the autoclave was purged with nitrogen, and hydrogen gas was then added so as to adjust the hydrogen partial pressure inside the autoclave to become 0.9 MPa. Thereafter, the temperature inside the autoclave was raised to 200° C. The gauge pressure at 200° C. was 1.5 MPa. The autoclave was held at 200° C. for 3 hours and then allowed to cool to room temperature and after returning the pressure to normal pressure by releasing the gas in the autoclave, the reaction solution was recovered. The catalyst was removed by filtration, and an aqueous adipic acid solution that is the supernatant was analyzed by HPLC, as a result, the adipic acid concentration was 0.1 g/L.

(Comparative Example 3) Production of Adipic Acid

The reaction was performed in the same manner as in Example 3 except that the aqueous solution after the passing through the ultrafiltration membrane was not passed through the nanofiltration membrane, but adipic acid was not produced.

The results of Example 3 and Comparative Example 3 demonstrated that when a filtrated liquid obtained after a 3-hydroxyadipic acid fermentation broth is adjusted to a pH of less than 7 by the addition of an acid and then passed through a nanofiltration membrane is subjected to a hydrogenation step, adipic acid can be produced.

In Examples below, the HPLC analysis of a reaction solution and an aqueous solution of a reaction solution concentrate was performed under the following HPLC analysis conditions 2. In the analysis conditions here, in addition to adipic acid, n-valeric acid that is a by-product obtained by conversion from 3-hydroxyadipic acid-3,6-lactone can be detected and quantitated.

[HPLC Analysis Conditions 2]

HPLC device: "Prominence" (manufactured by Shimadzu Corporation)

Column: "Synergi hydro-RP" (manufactured by Phenomenex Inc.), length: 250 mm, inner diameter: 4.60 mm, particle diameter: 4 μm Mobile phase: aqueous 0.1 wt % phosphoric acid solution/acetonitrile=0-10 minutes, fixed at 95/5 (volume ratio): 10-20 minutes, 95/5→80/20 (volume ratio); 20-40 minutes, 80/20→30/70 (volume ratio); 40-50 minutes, fixed at 30/70 (volume ratio)

Flow velocity: 1.0 mL/min

Detector: UV (210 nm)

Column temperature: 40° C.

Analysis time: 50 minutes

The n-valeric acid selectivity was defined by the following formula:

$n$-Valeric acid selectivity(mol %)=$n$-valeric acid production amount (mol)/reacted raw material (mol)×100

(Example 4) Production of Adipic Acid

An aqueous adipic acid solution was obtained by performing the reaction in the same manner as in Example 1 except that the HPLC analysis was conducted under HPLC analysis conditions 2. The results are shown in Table 2.

(Example 5) Production of Adipic Acid

The reaction was performed in the same manner as in Example 2 except that the HPLC analysis was conducted under HPLC analysis conditions 2. The results are shown in Table 2.

(Reference Example 4) Preparation of 3-hydroxyadipic acid-3,6-lactone methyl ester 3-Hydroxyadipic acid-3,6-lactone methyl ester used in the present invention was prepared by chemical synthesis. 100 mL of super dehydrated methanol (produced by FUJIFILM Wako Pure Chemical Corporation) was added to 10.0 g (0.06 mol) of 3-hydroxyadipic acid, and five drops of concentrated sulfuric acid (produced by FUJIFILM Wako Pure Chemical Corporation) were added thereto with stirring, followed by refluxing at 70° C. for 5 hours. After the completion of reaction, the reaction solution was concentrated using a rotary evaporator and then subjected to separation purification by silica gel column chromatography (hexane:ethyl acetate=4:1) to obtain 5.4 g of pure 3-hydroxyadipic acid-3,6-lactone methyl ester (yield: 48%). The NMR spectrum of the obtained 3-hydroxyadipic acid-3,6-lactone methyl ester is as follows.

$^1$H-NMR (400 MHz, CDCl$_3$): δ 1.93-2.02 (m, 1H), δ 2.44-2.52 (m, 1H), δ 2.56-2.87 (m, 2H), δ 2.66 (dd, 1H), δ 2.85 (dd, 1H), δ 3.73 (s, 3H), δ 4.87-4.94 (m, 1H)

(Example 6) Production of Adipic Acid

An aqueous adipic acid solution was obtained by performing the reaction in the same manner as in Example 5 except that 2.5 g of 3-hydroxyadipic acid-3,6-lactone methyl ester prepared in Reference Example 4 was used for the raw material. The results are shown in Table 2.

(Example 7) Production of Adipic Acid

To a stainless steel autoclave (manufactured by Taiatsu Techno Corporation) having an internal capacity of 0.1 L, 2 g of 3-hydroxyadipic acid-3,6-lactone (carboxylic acid), 20 mL of water, and 0.1 g of Palladium, 5% on gamma alumina powder, reduced (5% Pd/Al$_2$O$_3$, produced by Alfa Aesar) as a catalyst were added. The interior of the autoclave was purged with nitrogen, and hydrogen gas was then added so as to adjust the hydrogen partial pressure to become 0.9 MPa. Thereafter, the temperature inside the autoclave was raised to 200° C. The autoclave was held at 200° C. for 6 hours and then allowed to cool to room temperature, and the pressure was returned to normal pressure by releasing the gas in the autoclave. The solution in the autoclave was recovered in a 200 mL measuring flask and the flask was filled up with water. The catalyst was precipitated by centrifugation, and an aqueous adipic acid solution that is the supernatant was analyzed by GC and HPLC (HPLC analysis conditions 2). The results are shown in Table 2.

(Example 8) Production of Adipic Acid

An aqueous adipic acid solution was obtained by performing the reaction in the same manner as in Example 7 except that the reaction temperature and the reaction time were changed to 150° C. and 12 hours, respectively. The results are shown in Table 2.

(Example 9) Production of Adipic Acid

An aqueous adipic acid solution was obtained by performing the reaction in the same manner as in Example 7 except that the reaction temperature and the reaction time were changed to 160° C. and 9 hours, respectively. The results are shown in Table 2.

(Example 10) Production of Adipic Acid

An aqueous adipic acid solution was obtained by performing the reaction in the same manner as in Example 7 except that the reaction temperature and the reaction time were changed to 170° C. and 7 hours, respectively. The results are shown in Table 2.

(Example 11) Production of Adipic Acid

An aqueous adipic acid solution was obtained by performing the reaction in the same manner as in Example 7 except that the reaction temperature was changed to 180° C. The results are shown in Table 2.

(Example 12) Production of Adipic Acid

An aqueous adipic acid solution was obtained by performing the reaction in the same manner as in Example 7 except that the reaction temperature and the reaction time were changed to 220° C. and 3 hours, respectively. The results are shown in Table 2.

(Example 13) Production of Adipic Acid

An aqueous adipic acid solution was obtained by performing the reaction in the same manner as in Example 10 except that 5% palladium-supported carbon (5% Pd/C, produced by FUJIFILM Wako Pure Chemical Corporation) was used for the catalyst and the reaction time was changed to 8 hours. The results are shown in Table 2.

(Example 14) Production of Adipic Acid

An aqueous adipic acid solution was obtained by performing the reaction in the same manner as in Example 10 except that 5% platinum-supported carbon (5% Pt/C, produced by Sigma-Aldrich) was used for the catalyst and the reaction time was changed to 9 hours. The results are shown in Table 2.

(Example 15) Production of Adipic Acid

An aqueous adipic acid solution was obtained by performing the reaction in the same manner as in Example 10 except that the pH of the aqueous 3-hydroxyadipic acid-3,6 lactone solution was adjusted to 6 by using an aqueous 1 mol/L sodium hydroxide solution (produced by NACALAI TESQUE, INC.), Nickel on silica-alumina (Ni/SiO$_2$—Al$_2$O$_3$, produced by Alfa Aesar) was used for the catalyst, and the reaction time was changed to 8 hours. The results are shown in Table 2.

(Example 16) Production of Adipic Acid

An aqueous adipic acid solution was obtained by performing the reaction in the same manner as in Example 10 except that the pH of the aqueous 3-hydroxyadipic acid-3,6 lactone solution was adjusted to 6 by using an aqueous 1 mol/L sodium hydroxide solution (produced by NACALAI TESQUE, INC.), Raney nickel (Raney Ni, produced by FUJIFILM Wako Pure Chemical Corporation) was used for the catalyst, and the reaction time was changed to 6 hours. The results are shown in Table 2.

(Example 17) Production of Adipic Acid

An aqueous adipic acid solution was obtained by performing the reaction in the same manner as in Example 7 except that the hydrogen partial pressure was changed to 3.0 MPa. The results are shown in Table 2.

(Example 18) Production of Adipic Acid

To a stainless steel autoclave (manufactured by Taiatsu Techno Corporation) having an internal capacity of 0.1 L, 0.189 g of 3-hydroxyadipic acid-3,6-lactone (carboxylic acid), 30 mL of a water/methanol mixed solvent (water: 60 vol %), and 0.025 g of Palladium, 5% on gamma alumina powder, reduced (5% Pd/Al$_2$O$_3$, produced by Alfa Aesar) as a catalyst were added. The interior of the autoclave was purged with nitrogen, and hydrogen gas was then added so as to adjust the hydrogen partial pressure to become 0.9 MPa. Thereafter, the temperature inside the autoclave was raised to 170° C. The autoclave was held at 170° C. for 12 hours and then allowed to cool to room temperature, and the pressure was returned to normal pressure by releasing the gas in the autoclave. The solution in the autoclave was recovered in a 50 mL measuring flask and the flask was filled up with methanol. The catalyst was precipitated by centrifugation, and an aqueous adipic acid solution that is the supernatant was analyzed by GC and HPLC (HPLC analysis conditions 2). The results are shown in Table 2.

(Example 19) Production of Adipic Acid

To a stainless steel autoclave (manufactured by Taiatsu Techno Corporation) having an internal capacity of 0.1 L, 0.159 g of 3-hydroxyadipic acid-3,6-lactone (carboxylic acid), 30 mL of a water/dioxane mixed solvent (water: 90 vol %), and 0.025 g of Palladium, 5% on gamma alumina powder, reduced (5% Pd/Al$_2$O$_3$, produced by Alfa Aesar) as a catalyst were added. The interior of the autoclave was purged with nitrogen, and hydrogen gas was then added so as to adjust the hydrogen partial pressure to become 0.9 MPa. Thereafter, the temperature inside the autoclave was raised to 220° C. The autoclave was held at 220° C. for 3 hours and then allowed to cool to room temperature, and the pressure was returned to normal pressure by releasing the gas in the autoclave. The solution in the autoclave was recovered in a 50 mL measuring flask and the flask was filled up with water. The catalyst was precipitated by centrifugation, and an aqueous adipic acid solution that is the supernatant was analyzed by GC and HPLC (HPLC analysis conditions 2). The results are shown in Table 2.

(Example 20) Production of Adipic Acid

An aqueous adipic acid solution was obtained by performing the reaction in the same manner as in Example 19 except that tert-butanol was used in place of dioxane and the reaction temperature and the reaction time were changed to 200° C. and 4 hours, respectively. The results are shown in Table 2.

TABLE 2

| | Raw Material | Charged Amount of Raw Material (parts by weight) | Solvent | Catalyst | Reaction Time (hr) | Raw Material Conversion (mol %) | Adipic Acid Selectivity (mol %) | n-Valeric Acid Selectivity (mol %) | Content of n-Valeric Acid Relative to 100 Parts by Weight of Adipic Acid (parts by weight) |
|---|---|---|---|---|---|---|---|---|---|
| Example 4 | 3HAL | 0.3 | water | 5% Pd/γ-Al$_2$O$_3$ | 3 | >99.9 | 95.4 | 3.5 | 2.6 |
| Example 5 | 3HAL | 5.0 | water | 5% Pd/γ-Al$_2$O$_3$ | 3 | 90.4 | 89.9 | 5.9 | 4.6 |
| Example 6 | 3HAL methyl ester | 5.0 | water | 5% Pd/γ-Al$_2$O$_3$ | 3 | 87.9 | 92.6 | 4.9 | 3.7 |
| Example 7 | 3HAL | 10.0 | water | 5% Pd/γ-Al$_2$O$_3$ | 6 | 99.7 | 83.0 | 13.3 | 11.2 |
| Example 8 | 3HAL | 10.0 | water | 5% Pd/γ-Al$_2$O$_3$ | 12 | 92.0 | 99.9 | 0.1 | 0.07 |
| Example 9 | 3HAL | 10.0 | water | 5% Pd/γ-Al$_2$O$_3$ | 9 | >99.9 | 99.6 | 0.2 | 0.14 |
| Example 10 | 3HAL | 10.0 | water | 5% Pd/γ-Al$_2$O$_3$ | 7 | 98.8 | 99.6 | 0.4 | 0.28 |
| Example 11 | 3HAL | 10.0 | water | 5% Pd/γ-Al$_2$O$_3$ | 6 | 95.7 | 91.6 | 7.0 | 5.3 |
| Example 12 | 3HAL | 10.0 | water | 5% Pd/γ-Al$_2$O$_3$ | 3 | >99.9 | 82.1 | 14.1 | 12.0 |
| Example 13 | 3HAL | 10.0 | water | 5% Pd/C | 8 | 99.0 | 99.2 | 0.4 | 0.28 |

TABLE 2-continued

| | Raw Material | Charged Amount of Raw Material (parts by weight) | Solvent | Catalyst | Reaction Time (hr) | Raw Material Conversion (mol %) | Adipic Acid Selectivity (mol %) | n-Valeric Acid Selectivity (mol %) | Content of n-Valeric Acid Relative to 100 Parts by Weight of Adipic Acid (parts by weight) |
|---|---|---|---|---|---|---|---|---|---|
| Example 14 | 3HAL | 10.0 | water | 5% Pt/C | 9 | 99.2 | 99.5 | 0.5 | 0.35 |
| Example 15 | 3HAL | 10.0 | water | Ni/SiO$_2$-Al$_2$O$_3$ | 8 | >99.9 | 85.0 | 6.8 | 5.6 |
| Example 16 | 3HAL | 10.0 | water | Raney Ni | 6 | 95.4 | 94.0 | 3.5 | 2.6 |
| Example 17 | 3HAL | 10.0 | water | 5% Pd/γ-Al$_2$O$_3$ | 6 | 99.9 | 92.0 | 4.4 | 3.3 |
| Example 18 | 3HAL | 0.7 | water/methanol 6/4 v/v | 5% Pd/γ-Al$_2$O$_3$ | 12 | 99.0 | 95.5 | 0.5 | 0.37 |
| Example 19 | 3HAL | 0.5 | water/dioxane 9/1 v/v | 5% Pd/γ-Al$_2$O$_3$ | 3 | >99.9 | 83.3 | 16.1 | 13.5 |
| Example 20 | 3HAL | 0.5 | water/tert-butanol 9/1 v/v | 5% Pd/γ-Al$_2$O$_3$ | 4 | 98.1 | 93.2 | 6.5 | 4.9 |

3HAL = 3-hydroxy adipic acic-3,6-lactone
Charged amount of raw material (parts by weight) is a numerical value based on 100 parts by weight of solvent.

The invention claimed is:

1. A method of producing adipic acid, comprising:
condensing 3-hydroxyadipic acid in water to obtain a 3-hydroxyadipic acid-3,6-lactone aqueous solution;
purifying the 3-hydroxyadipic acid-3,6-lactone aqueous solution to obtain a raw material comprising 3-hydroxyadipic acid-3,6-lactone as a main component;
hydrogenating the raw material with hydrogen in an aqueous solvent in a presence of a hydrogenation catalyst to obtain an adipic acid-containing aqueous solution; and
separating adipic acid from the adipic acid-containing aqueous solution.

2. The method according to claim 1, wherein the hydrogenation catalyst comprises one kind or two or more kinds of transition metal elements selected from the group consisting of palladium, platinum, ruthenium, rhodium, rhenium, nickel, cobalt, iron, iridium, osmium, copper, and chromium.

3. The method according to claim 1, wherein the hydrogenation catalyst is supported on a support.

4. The method according to claim 3, wherein the support is a support having an acid catalytic activity.

5. The method according to claim 1, wherein a reaction temperature in the hydrogenating step is from 100 to 350° C.

6. The method according to claim 1, wherein the hydrogenating step is performed in an absence of ammonia.

7. The method according to claim 1, wherein a filtrated liquid obtained after a 3-hydroxyadipic acid fermentation broth is adjusted to a pH of less than 7 by adding an acid and then passed through a nanofiltration membrane is subjected to the hydrogenating step.

8. The method according to claim 1, wherein the condensing step is adding an acid to 3-hydroxyadipic acid in water.

9. The method according to claim 1, wherein the condensing step is condensing 3-hydroxyadipic acid in a 3-hydroxyadipic acid fermentation broth.

* * * * *